Jan. 4, 1949.  H. A. FLAGGE  2,457,813
LUBRICATOR AND MIXING DEVICE
Filed May 24, 1945  2 Sheets-Sheet 1

Inventor
HOWARD A. FLAGGE
By Ralph L Chappell
Attorney

Jan. 4, 1949.  H. A. FLAGGE  2,457,813
LUBRICATOR AND MIXING DEVICE
Filed May 24, 1945  2 Sheets-Sheet 2

Inventor
HOWARD A. FLAGGE.

Patented Jan. 4, 1949

2,457,813

UNITED STATES PATENT OFFICE 2,457,813

LUBRICATOR AND MIXING DEVICE

Howard Avery Flagge, Norfolk, Va.

Application May 24, 1945, Serial No. 595,622

1 Claim. (Cl. 184—55)

(Granted under the act of March 3, 1883, as amended April 30, 1928; 370 O. G. 757)

This invention relates to mixing devices and more particularly to a new and improved device for mixing lubricant throughout a fluid.

In the lubrication of internal combustion engines, air compressors, pneumatic hammers and like devices it has been a problem to provide lubricant in adequate and yet controlled amounts to the moving parts. It has further been difficult to provide a lubricator which delivers a steady flow of lubricant in substantially uniform proportions responsive to the speed of operation of the device being lubricated and which is simple in design, easily to fabricate and it will be free from servicing troubles over a long period of time.

The lubricator constructed in accordance with the present invention has for one of its objects the overcoming of the above enumerated difficulties.

In all fluid operated motors or fluid compressors there is a fluid chamber or passage within which repeated pressure changes take place and it is contemplated that the device of the present invention which will be installed upon the wall of or adjacent to, such chamber or passage so that the pressure variations occurring therein may be transmitted to within the lubricator and serve to release small measured quantities of lubricant which is conducted to within the fluid chamber by the fluid and serves to lubricate the moving parts therein provided.

For a more complete understanding of the invention and for other objects and advantages thereof, reference should now be had to the following description in connection with the accompanying drawing, in which.

Figure 1:
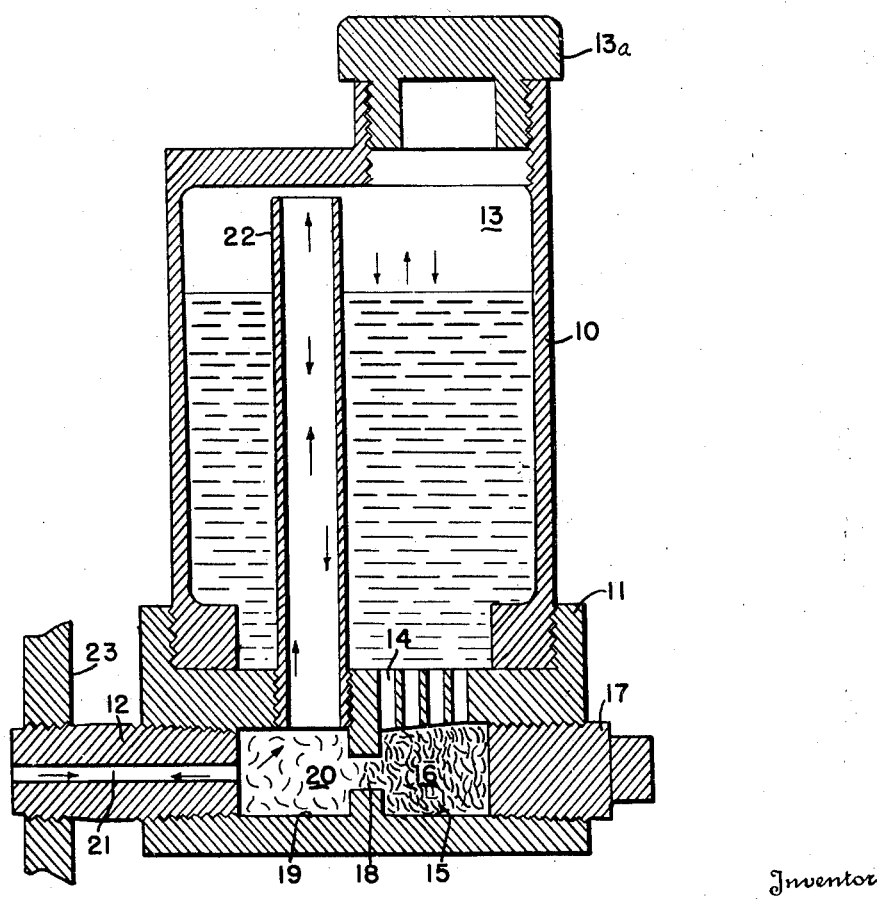
Fig. 1 is a vertical sectional view through a device incorporating one embodiment of the present invention.

Referring to the drawings in detail; as indicated in Fig. 1, the lubricator of the present invention may comprise a housing 10 having a base 11 which may be connected to the chamber in connection with which it is used by means of a threaded nipple 12.

The housing 10 has a lubricant reservoir 13 therein and lubricant may be supplied through an opening closed by a threaded cap 13a. At the bottom of the chamber are provided a plurality of openings 14 through which lubricant may pass into a lower chamber 15. This chamber is preferably packed with a wick of absorbent material which may be inserted through the opening normally closed by plug 17 and, upon insertion of the plug 17 and screwing same tightly into place, the packing 16 will be tightly compressed. The oil from reservoir 13 gradually works its way through the tightly compressed packing 16 and, by means of communicating passage 18 may be conducted by capillary action into an adjoining chamber 19. This chamber 19 is also provided with a wick of absorbent material 20 but which is much more loosely packed so as to permit the passage therethrough of air, gas or other fluid which may enter through internal passage 21 in the nipple 12. A vertical standpipe 22 extends from this second chamber 19 to within the lubricant supply chamber 13, opening into the chamber immediately adjacent the top thereof.

In use the lubricator is mounted upon a wall such as the wall of chamber 23 by any suitable means such as the tapered pipe threads on the end of the nipple 12 so that the device is supported thereby. If desired, other arrangements may be made to place the device in communication with the interior of the lubricator. Pressure pulsations within the chamber 23 will then travel through passage 21 past the lightly packed absorbent wick 20 through chamber 19 and upwardly through standpipe 22 to register upon the surface of the lubricant within chamber 13. As these pressure pulsations alternate, lubricant is lead from chamber 13 and by absorption gradually works its way through passages 14 into the chamber 15 which is tightly packed with the absorbent material 16. Variations in pressure induce a limited amount of lubricant to pass through the tightly packed material 16 and, by means of communicating passage 18, the lubricant is lead into the adjoining chamber 19 where it is communicated throughout the loosely packed absorbent material 20 located therein by means of capillary attraction.

The pulsating air, which enters and leaves the lubricator at rapid intervals and in its passage must travel through the loosely packed material 20 in chamber 19, is thus provided with a controlled amount of lubricant from that suspended in the absorbent material 20 and the fluid within chamber 23 gradually becomes filled with a minute dispersion of lubricant.

It will be apparent that the embodiment just described is simple in design, includes parts which are readily machined and assembled and, having no moving parts or parts which require accurate adjustment, does not readily get out of order.

In order to adjust the rate of lubricant flow through chamber 15, the packing 16 thereof may be placed under varying degrees of compression or compactness by adjustment of the threaded plug 17. For this purpose, of course, straight threads must be employed thereon. Otherwise, if no adjusting feature is desired, a tapered threaded plug may be employed.

It will be further apparent that with the above construction the amount of lubricant provided to the fluid will vary in proportion to the number and intensity of the pulsations or variations in pressure. Hence, a slowly running engine or compressor with slow pulsations will not be provided with an over supply of lubricant while when the engine is speeded up the amount of lubricant will be correspondingly increased.

Figure 3:
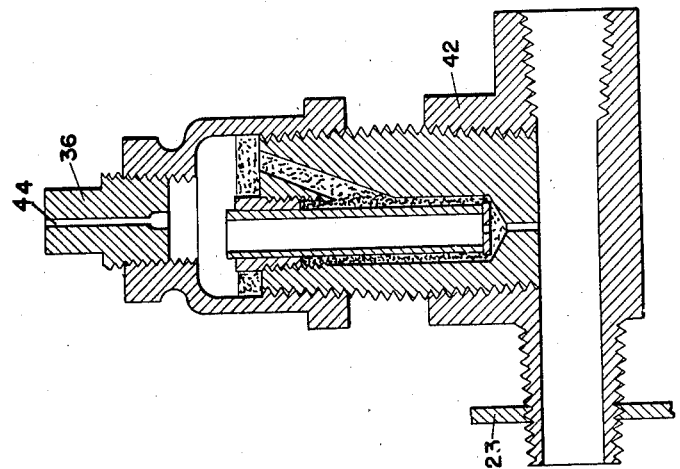
Fig. 3 is a vertical sectional view through the embodiment illustrated in Fig. 2 showing a different means for attaching it in place.
Figure 2:
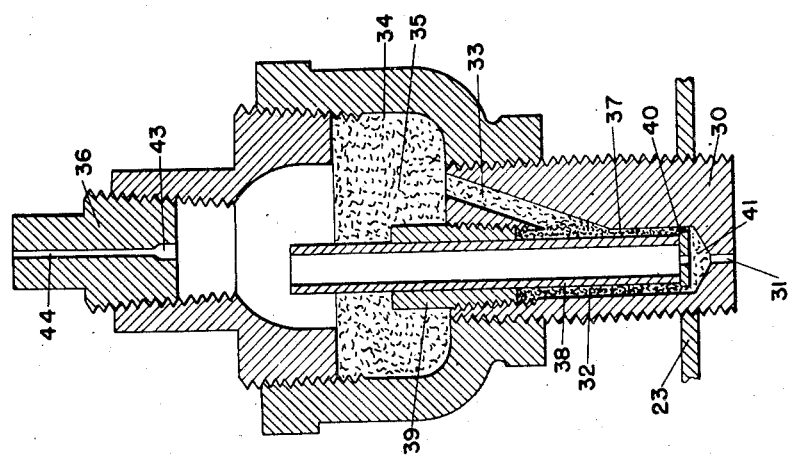
Fig. 2 is a vertical sectional view through a device incorporating another embodiment of the present invention.

In the embodiment illustrated in Figs. 2 and 3 there is shown a similar lubricator for use when the oil reservoir need not be so large and in which the lubricant chamber incorporating the absorbent wick is more compactly situated adjacent the fluid standpipe.

In this embodiment there is provided a nipple 30 which may be threaded into the chamber to which the lubricant is to be supplied, which may be the chamber 23 heretofore described, and the lubricator is here shown provided with an interior passage 31 enlarging into a bore portion 32 which has a branch 33 leading upwardly into a lubricant supply reservoir 34. This reservoir 34 may be packed with absorbent material 35 kept saturated by lubricant which may be replenished through the removable filler plug 36.

As in the previous embodiment lubricant from the chamber 34 is conducted through absorbent packing material 37 which in this embodiment is tightly compressed about a standpipe 38 by means of a threaded gland nut 39. Rotation of this gland nut increases the pressure upon the absorbent material 37 and correspondingly varies the amount of lubricant which may pass therethrough. At the bottom of the standpipe 38 may be provided a centrally apertured washer 40 below which is a space packed with loosely compacted absorbent material 41.

As in the previous embodiment fluid such as air under repeated pressure variations is forced into and out of the lubricator entering by means of opening 31 and passing through the loosely packed absorbent material 41, through the central opening in washer 40, and, by means of standpipe 38, the pressure variations are brought into the lubricant reservoir chamber 34 to apply similar pressure variations upon the lubricant therein. This works the lubricant down through the material in passage 33 and the tightly packed material 37 surrounding the standpipe where the tightness of the packing of the material controlled by gland nut 39 determines the amount of lubricant which passes from the device.

By capillary attraction the absorbent material 41 is kept supplied with lubricant and the air passing through material 41 is provided with a controlled and regulated amount of lubricant which is dispersed therethrough.

In the modification illustrated in Fig. 3, the embodiment just described is shown installed in a T fitting 42 which may be employed to connect the lubricator to any desired point. In addition the reservoir is of a somewhat simplified construction.

In both modifications illustrated in Figs. 2 and 3, the filler plug 36 may be provided with a small air vent including an opening 43 and a very small passage, such as the passage 44, communicating with the outside air.

The present invention is adapted to be used on any fluid device wherein it is desired to disperse lubricant in small controlled quantities through air, gas or other fluid. If used for internal combustion engines it should be connected to the intake manifold as close as practicable to the carburetor.

The invention described herein may be manufactured and used by or for the Government of the United States of America for governmental purposes without the payment of any royalties thereon or therefor.

It will be apparent that the device of the present invention may be used for mixing any desired material such as alcohol, water or other material throughout a fluid. Though shown and described in conjunction with a lubricator it is not intended that the present invention be limited thereto since many modifications may be made, and it is, therefore, contemplated by the appended claims to cover any such modifications as fall within the true spirit and scope of this invention.

Having thus described the invention, what is claimed and desired to be secured by Letters Patent is:

A lubricator for feeding lubricant into a fluid chamber wherein successive pulsations in fluid pressure recur, said lubricator comprising a housing having a lubricant reservoir therewithin, said housing having a reservoir replenishing opening at the top thereof, a plug for sealing said opening, a standpipe extending vertically through said reservoir to adjacent the top thereof, a base on which said reservoir housing is mounted, a chamber in said base to which chamber said standpipe is connected, a loosely packed wick in said base chamber, a restricted passage connecting said base chamber to the fluid chamber to be lubricated, a second chamber in said base, a restricted opening connecting said base chambers together, a tightly packed wick in said second base chamber and a passage between said second base chamber and the bottom of said lubricant reservoir, whereby pressure pulsations may pass through said restricted passage to said first base chamber and through said standpipe to the top of said reservoir, and lubricant from said lubricant reservoir may pass down through said second base chamber from said passage therebetween, slowly through the tightly packed wick and through said restricted opening connecting said base chambers to said first base chamber to be picked up and carried by said pressure pulsations passing therethrough back to the fluid chamber to be lubricated.

HOWARD AVERY FLAGGE.

REFERENCES CITED

The following references are of record in the file of this patent:

UNITED STATES PATENTS

| Number | Name | Date |
| --- | --- | --- |
| 1,045,462 | Turner | Nov. 26, 1912 |
| 1,109,222 | Hansen | Sept. 1, 1914 |
| 1,122,109 | Hansen | Dec. 22, 1914 |
| 1,177,910 | Ward | Apr. 4, 1916 |
| 1,194,650 | McKay | Aug. 15, 1916 |
| 1,594,944 | Hansen | Aug. 3, 1926 |
| 1,620,253 | Gates | Mar. 8, 1927 |